United States Patent [19]

Kanai et al.

[11] Patent Number: 4,486,883
[45] Date of Patent: Dec. 4, 1984

[54] ADDRESS CHECK SYSTEM

[75] Inventors: Tsutomu Kanai; Yoshio Kizaki, both of Tokyo, Japan

[73] Assignee: Clarion Co., Ltd., Tokyo, Japan

[21] Appl. No.: 345,404

[22] Filed: Feb. 3, 1982

[51] Int. Cl.³ .............................................. G06F 11/10
[52] U.S. Cl. ........................................ 371/67; 371/49; 340/825.07
[58] Field of Search ............... 371/49, 67; 340/825.07, 340/825.16

[56] References Cited

U.S. PATENT DOCUMENTS 3,648,256  3/1972  Paine et al. ............................ 371/49
3,914,741  10/1975  Bonser et al. ........................ 371/49

Primary Examiner—Charles E. Atkinson
Attorney, Agent, or Firm—Russell E. Hattis

[57] ABSTRACT

An address check system which comprises receiving stations each receiving address information and control information transmitted by a transmitting station and take the control information in when the address coincides with the own address and further has a means for detecting changes in its own address.

7 Claims, 2 Drawing Figures

ADDRESS CHECK SYSTEM

BACKGROUND OF THE INVENTION

1. Field of the Invention

This invention relates to an address check system and more particularly to an address check system in a system such as a pay-TV system for controlling a plurality of receiving stations by a single or a few transmitting stations, and so improved as to prevent that each receiving station gets out of the control by the transmitting station due to change of the address of the receiving station.

2. Description of the Prior Art

The system for controlling the functions of a plurality of receiving stations by a single or a few transmitting stations in the wireless manner or in a wired signal transmitting manner has generally been so arranged that different user numbers (addresses) are previously allotted to respective stations. The transmitting station sends the addresses and control information, and each receiving station then acts upon the control information only when its own address is called otherwise it ignores the control information.

In such a system, however, if the address of a receiving station has changed due to the disorder of the apparatus thereof or due to the unexpected operation of the apparatus with the intention or negligence of the subscriber, the receiving station ceases to function under the control by the transmitting station. However, no address checking method capable of preventing such an undesirable problem has yet conventionally been adopted. Therefore, when the abovementioned problem occurs, it has been impossible to prevent the subscriber from tapping. It is a serious problem which cannot be ignored in operating such a system.

OBJECT OF THE INVENTION

It is therefore an object of the present invention to improve the security of the system operation by providing each receiving station with a detecting means for detecting a change of its own address and interrupting the function of the receiving station in response to the detected change.

DETAILED DESCRIPTION OF THE PREFERRED EMBODIMENTS

Figure 1:
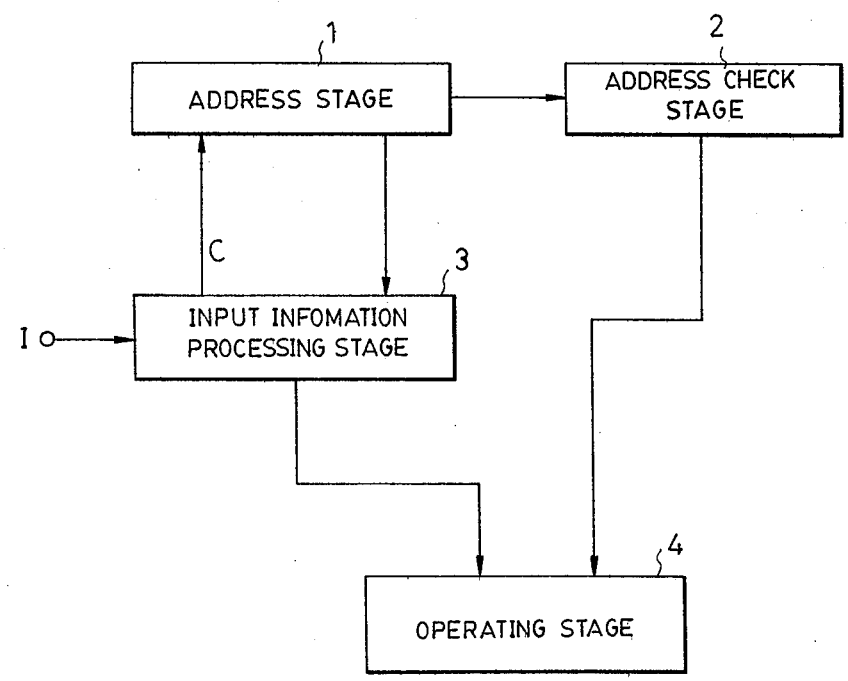
FIG. 1 shows a block diagram illustrating an embodiment according to the present invention.

The present invention will now be described in detail referring to the preferred embodiment illustrated in the drawings.

FIG. 1 shows an embodiment where the address check system according to the present invention is adopted in each receiving station of the above-described system like a pay-TV system.

In the same drawing, the reference numeral 1 designates an address part of the receiving station, 2 an address check part, 3 an incoming information processing part and 4 a functional part of the receiving station.

The user address for the receiving station is allotted to the address part 1. The incoming information processing stage 3 receives an information signal I which comprises an address information signal and a control information signal and provides the address stage 1 with a control signal C to pick up the address data therefrom. This stage 3 thereby compares the address information with the address data and transmits the control information to the operating stage 4 in response to the result of the comparison.

The address check stage 2 checks in a predetermined manner if its own address allotted to the address stage 1 is right or not and then outputs an address check signal to the functional stage 4 when any error is found in its own address.

The functional stage 4 is supplied with the control information and the address check signal to thereby perform predetermined operations. This stage, however, performs the predetermined operations in response to the control information only when the address check signal is not generated, i.e. if address match occurs, whereas it stops the operations when the address check signal is generated.

Figure 2:
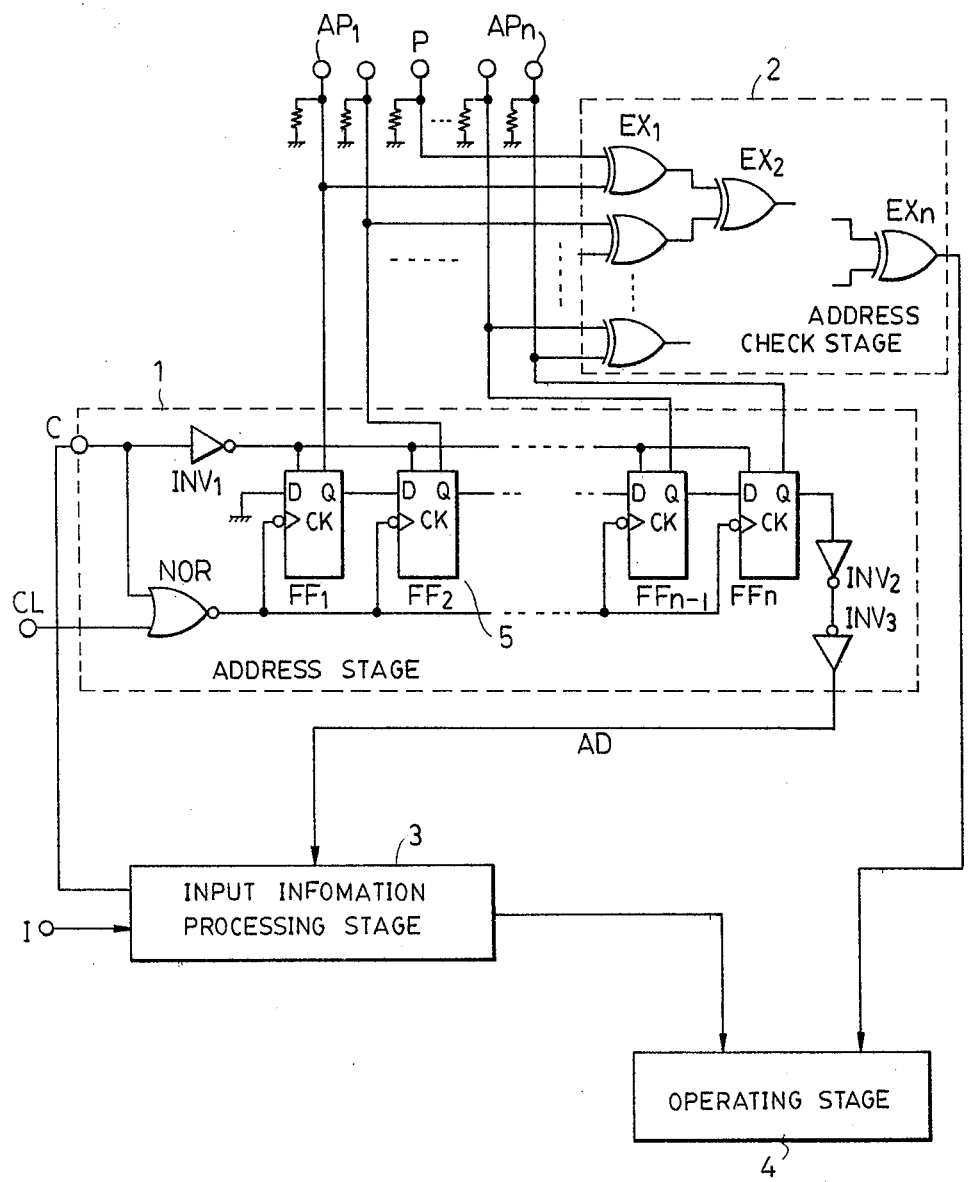
FIG. 2 shows a circuit diagram illustrating an arrangement of the part of the address part and the address check part shown in FIG. 1.

FIG. 2 shows the arrangement of the address stage 1 and the address check stage 2. In the same drawing, the reference numeral 5 denotes a shift register circuit, wherein $FF_1$-$FF_n$ are flip-flop circuits, $AP_1$-$AP_n$ are n address setting pins each connected to a parallel-load terminal of each of the flip-flop circuits $FF_1$-$FF_n$, P is a parity setting pin, $INV_1$-$INV_3$ are inverters and NOR is a NOR gate.

The shift register circuit 5, when the control signal from the incoming information processing part 3 lowers, outputs an address data allotted to each of the flip-flop circuits $FF_1$-$FF_n$ synchronizing it with the clock signal CL and supplies the incoming information processing part 3 with it.

The user address is set by properly providing the respective address setting pins $AP_1$-$AP_n$ with high-level (or low-level) address setting signals. In this case, any change of its own address comprising an odd number of bits can be detected by setting a high-level (or low-level) parity signal to the parity setting pin P so that the number of the address setting pins for setting the high level signal to is odd (or even).

To this end, the address setting signal and the parity signal are applied to the address check stage 2. The address check stage 2 comprises a plurality of exclusive "or" circuits $EX_1$-$EX_n$, for example, to perform the parity check. The address check signal detected by the address check stage 2 as the result of the parity check is sent to the functional part 4.

Although the above-mentioned arrangement utilizes detecting methods such as parity check, by adding surplus bits to the address bits, the capacity of detecting changes of the address data can be further improved by dividing each series of the address bits of the address setting signal into several groups and detecting changes of the address data on each group.

Further, various methods for detecting change of the local address may be used in addition to the parity check. For example, one would be to record the number of the bits to be set at a high (or low) level among the address bits and store a representation thereof in the surplus bits using binary digits.

As described above, according to the present invention where the receiving stations have such an address check function, it is possible to easily prevent each receiving station from passing out of the control of the system and not to continue its function when its address has been changed.

Further, when the parity setting pin P is placed among the address setting pins as in the above-mentioned embodiment, the secrecy of the address increases from the viewpoint of the outward appearance.

We claim:

1. An address check system for a transmission system having means for transmitting control and address information to at least one receiver, said address information being representable as a binary address-defining number, address entering and storing means associated with said receiver for storingly entering a local address as a binary electrical representation thereof in the form of local address-setting bits, address comparison means associated with said receiver for comparing said transmitted address-defining number with said local address, and control means associated with said receiver for blocking the passage of said control information responsively to detecting a mismatching condition by said address matching means, the improvement comprising:
   said means for entering and storing said local address including means for entering said local address in a parallel line representation, said representation including said address-setting bits representing a binary number and further including one or more protocol-setting bits placed on a chosen one or more of said parallel lines;
   protocol comparison means for selectively testing at least one of said local address-setting bits and at least one of said protocol-establishing bits to detect a protocol-matching condition therebetween according to a given protocol defined solely by said protocol comparison means and bearing no specific relationship to transmitted signals; and
   means for actuating said control means to block said passage of said control information when a mismatch condition is detected by said protocol comparison means.

2. The address check system of claim 1 wherein said protocol includes establishing the parity of said at least one selected address-setting bit to correspond to the parity of said at least one protocol-setting bit.

3. The address check system of claim 2 wherein only one protocol-setting bit is employed, and said protocol includes establishing the parity of said protocol-setting bit to correspond to the parity of all of said address-setting bits.

4. The address-check system of claim 1 wheren said means for entering and storing said local address includes externally accessible terminals coupled to said parallel lines, and wherein all of said terminals are visually indistinguishable from each other.

5. The address-check system of claim 2 wherein said means for entering and storing said local address includes externally accessible terminals coupled to said parallel lines, and wherein all of said terminals are visually indistinguishable from each other.

6. The address-check system of claim 3 wherein said means for entering and storing said local address includes externally accessible terminals coupled to said parallel lines, and wherein all of said terminals are visually indistinguishable from each other.

7. The address-check system of claim 4 further comprising a shift register coupled to said parallel lines so as to acceptingly store said address-setting bits as a serial string therein.

* * * * *